(12) United States Patent
Wichowski et al.

(10) Patent No.: US 9,459,608 B2
(45) Date of Patent: Oct. 4, 2016

(54) SYNCHRONIZATION MODULE FOR MOTOR SPEED CONTROL

(71) Applicant: Hamilton Sundstrand Space Systems International, Inc., Windsor Locks, CT (US)

(72) Inventors: Robert P. Wichowski, Westfield, MA (US); Kevin G. Hawes, Windsor Locks, CT (US); Patrick J. Sears, South Hadley, MA (US); Sean K. Murray, Enfield, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 47 days.

(21) Appl. No.: 14/498,695

(22) Filed: Sep. 26, 2014

(65) Prior Publication Data

US 2016/0094162 A1    Mar. 31, 2016

(51) Int. Cl.
*H02P 1/50*   (2006.01)
*G05B 19/042*   (2006.01)
*G06F 1/12*   (2006.01)
(Continued)

(52) U.S. Cl.
CPC .............. *G05B 19/0421* (2013.01); *G06F 1/12* (2013.01); *H02P 5/526* (2013.01); *H02P 6/00* (2013.01); *H04L 7/00* (2013.01); *G05B 2219/25473* (2013.01); *G05B 2219/25484* (2013.01)

(58) Field of Classification Search
CPC .............. H02P 5/46; H02P 6/18; H02P 6/14; H02P 6/00
USPC ......... 318/266, 268, 400.01, 400.14, 400.15, 318/568.22, 595, 599, 633, 700, 721, 779, 318/799, 811, 400.12, 706; 388/800, 819, 388/823
See application file for complete search history.

(56) References Cited

U.S. PATENT DOCUMENTS 5,798,623 A * 8/1998 El-Sadi .................... H02P 6/06
                                                        318/400.12
6,535,926 B1   3/2003 Esker
(Continued)

FOREIGN PATENT DOCUMENTS

EP          2701300 A1     2/2014
WO    WO-2006094013 A2    9/2006
WO    WO-2014149089 A1    9/2014

OTHER PUBLICATIONS

Extended European Search Report issued on corresponding European Patent Application No. Application No. 15182533.8—1802, dated Feb. 15, 2016.
(Continued)

*Primary Examiner* — Antony M Paul
(74) *Attorney, Agent, or Firm* — Locke Lord LLP; Scott D. Wofsy; Daniel J. Fiorello

(57) ABSTRACT

A system includes a first control system configured to operate at a first clock speed, a second control system configured to provide an output to the first control system and configured to operate at a second clock speed different from the first clock speed, and a synchronization module operatively connecting the first control module to the second control module and configured to synchronize the first control system and the second control system such that the output of the second control system is timed to synchronize with the first clock speed.

9 Claims, 2 Drawing Sheets

(51) Int. Cl.
*H02P 6/00* (2016.01)
*H04L 7/00* (2006.01)
*H02P 5/52* (2016.01)

(56) References Cited

U.S. PATENT DOCUMENTS 7,148,635 B1* 12/2006 Piefer ................ B41F 13/0045
                                                    318/34
8,466,645 B2*  6/2013 Inoue ................. H02P 23/0068
                                                    318/400.13
2001/0036031 A1* 11/2001 Hirano .................. G11B 21/22
                                                    360/75
2009/0167221 A1*  7/2009 Rouis ..................... H02P 6/142
                                                    318/400.14
2013/0043814 A1   2/2013 Chuah et al.

OTHER PUBLICATIONS

Bogdan Alecsa et al., "Design, validation and FPGA implementation of a brushless DC motor speed controller", Electronics, Circuits, and Systems (ICECS), Dec. 12, 2010, IEEE.

* cited by examiner

SYNCHRONIZATION MODULE FOR MOTOR SPEED CONTROL

BACKGROUND

1. Field

The present disclosure relates to control systems, more particularly to asynchronous control systems and systems for motor controlling.

2. Description of Related Art

A field-programmable gate array (FPGA) is an integrated circuit designed to be configured by a customer or a designer after manufacturing, hence the name "field-programmable". The FPGA configuration is generally specified using a hardware description language (HDL), similar to that used for an application-specific integrated circuit (ASIC). FPGA modules traditionally operate at a clock speed on the order of MHz.

An FPGA can be associated with an electric motor control systems to provide additional control and/or feedback systems for enhanced motor operation. However, the motor control systems can operate at a clock speed on the order of 10's to 100's of Hz. This causes asynchronous timing between the FPGA commands and the motor control systems which traditionally require computationally intensive or energy taxing solutions.

Such conventional methods and systems have generally been considered satisfactory for their intended purpose. However, there is still a need in the art for improved event synchronization systems and methods. The present disclosure provides a solution for this need.

SUMMARY

In at least one aspect of this disclosure, a system includes a first control system configured to operate at a first clock speed, a second control system configured to provide an output to the first control system and configured to operate at a second clock speed different from the first clock speed, and a synchronization module operatively connecting the first control module to the second control module and configured to synchronize the first control system and the second control system such that the output of the second control system is timed to synchronize with the first clock speed.

The system can further include an electric motor operatively connected to the second control system. The first control system can include a motor compensation controller for controlling speed of the motor. The second control system can include a field-programmable gate array (FPGA). In some embodiments, both systems can be contained in an FPGA.

The first clock speed can be less than about 1 MHz. The second clock speed can be greater than about 1 MHz. In some embodiments, the first clock speed can be about 100 Hz.

In certain embodiments, the synchronization module is implemented on one of the first control system, the second control system, or a state machine. The system can be configured to start a loop sample timer to sample the clock speed of the first control system or to track the clock speed of the first control system, receive speed data regarding the speed of the electric motor, calculate error of the speed of the motor as compared to a speed command, generate a new duty cycle command for input into the first control system, and input the new duty cycle command into the first control system upon completion of the loop sample timer.

In at least one aspect of this disclosure, a method for synchronizing asynchronous control systems can include initializing an electric motor compensation to control speed of an electric motor, starting a loop sample timer to sample the clock speed of a motor control system or to track the clock speed of the motor control system, receiving speed data regarding the speed of the electric motor, calculating error of the speed of the motor as compared to a speed command, generating a new duty cycle command for input, and inputting the new duty cycle command upon completion of the loop sample timer. Receiving speed data can include determining the speed of the electric motor based on rotor position versus time data.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
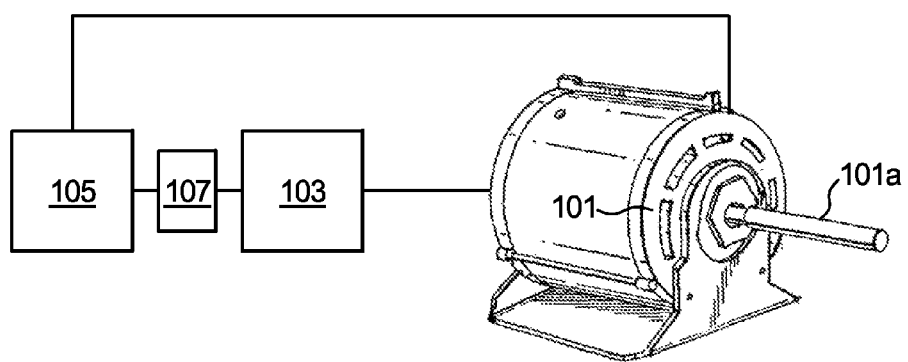
FIG. 1 is a schematic view of an embodiment of a system in accordance with this disclosure, showing two control systems operatively connected to an electric motor for controlling the motor.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. The systems and methods described herein can be used to synchronize asynchronous events (e.g., for synchronizing separate control systems operating in different clock domains).

Referring to FIG. 1, in at least one aspect of this disclosure, a system 100 includes a first control system 103 configured to operate at a first clock speed. The first clock speed can be less than about 1 MHz. and will be inversely proportional to the motor system compensation sampling period (e.g., about 100 Hz). In some embodiments, the system 100 can further include an electric motor 101 (e.g., a DC brushless electric motor) operatively connected to the first control system 103. The first control system 103 can include a motor compensation controller for controlling speed of the motor 101 or any other suitable control system. This control system can include or be implemented using a field-programmable gate array (FPGA).

A second control system 105 is configured to provide an output to the first control system 103 and is configured to operate at a second clock speed different from the first clock speed. The second control system can include a field-programmable gate array (FPGA) and/or any other suitable hardware and/or software. In such embodiments, the second clock speed can be greater than about 1 MHz (e.g., hundreds of MHz). The FPGA can be programmed using suitable hardware description language (HDL) components or any other suitable programming. In some embodiments, both control systems can be contained in an FPGA.

The system 100 further includes a synchronization module 107 operatively connecting the first control module 103 and the second control module 105. The synchronization module 107 is configured to synchronize the first control system 103 and the second control system 105 such that the output of the second control system 105 is timed to synchronize with the first clock speed of the first control system 103.

The synchronization module 107 can be implemented on one of the first control system, the second control system, a separate state machine, or any other suitable device. The system 100, in conjunction with the synchronization module 107, can be configured to start a loop sample timer to sample the clock speed of the first control system 103, to track the clock speed of the first control system 103, and/or to use a stored first clock speed as a timer.

The second control system 105 can receive speed data regarding the speed of the electric motor 101 from any suitable sensor and/or method (e.g., comparing two positions of a rotor 101a versus time elapsed). The second control system 105 can calculate error of the speed of the motor 101 as compared to speed command that was input into/by the first control system 103 and provide this error to a suitable filter (e.g. a digital filter).

The second control system 105 can then generate a new duty cycle command for input into the first control system 103 to modify the speed of the motor 101 as needed. At this point, the second control system 105 waits for the synchronization module 107 to indicate that the loop sample timer has elapsed before outputting the new duty cycle command to the first control system 107. When the synchronization module 107 (e.g., operating on a state machine) indicates that the loop sample timer has completed, the second control system 105 can input the new duty cycle command into the first control system 103 and the new command will be timed to match up with the first clock speed of the first control system 103, allowing synchronization.

Figure 2:
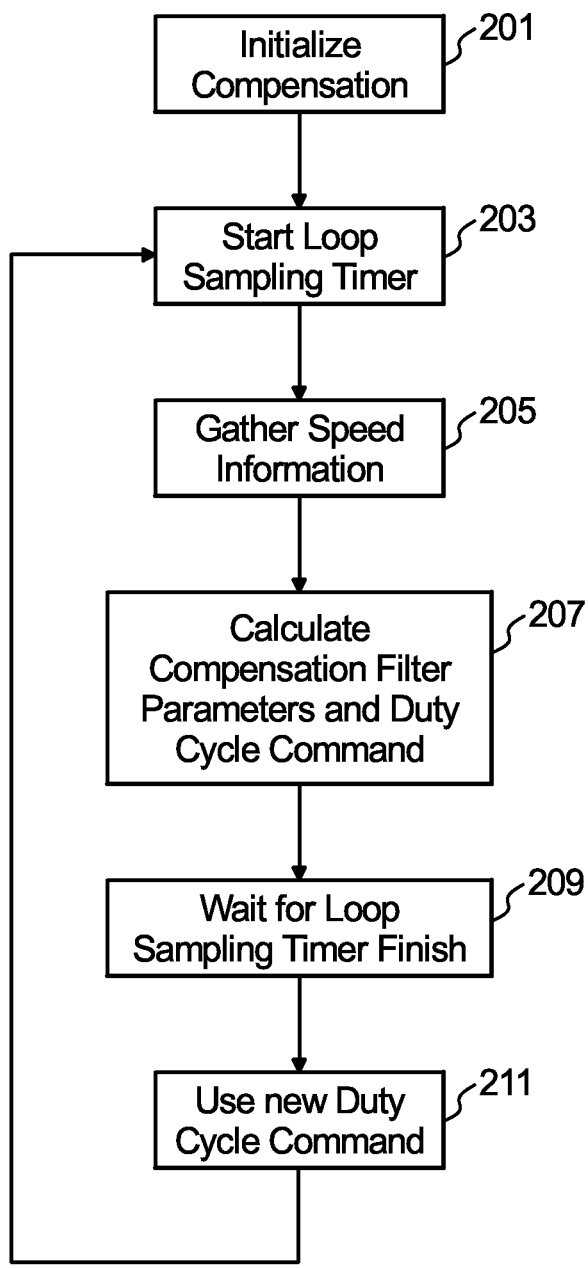
FIG. 2 is a schematic view of an embodiment of a method for synchronizing asynchronous events in accordance with this disclosure.

Referring to FIG. 2, in at least one aspect of this disclosure, a method 200 for synchronizing asynchronous control systems is shown and can include initializing an electric motor compensation to control speed of an electric motor at block 201 (e.g., registering an initial value, e.g., 0% Duty Cycle/0 RPM). Block 203 can include starting a loop sample timer to sample the clock speed of a motor control system (e.g., first control system 103), to track the clock speed of the motor control system.

Block 205 includes receiving/gathering speed data regarding the speed of the electric motor 101 in any suitable manner. Block 207 can include calculating error of the speed of the motor 101 as compared to a speed command (e.g., compensation filter) of the motor control system and generating a new duty cycle command for input to the motor control system.

Block 209 of the method 200 further includes waiting for the loop sample timer to finish before inputting the new duty cycle commands. Block 211 can include inputting the new duty cycle command upon completion of the loop sample timer. The method 200 can then repeat from block 203.

It is contemplated herein that receiving speed data can further include determining the speed of the electric motor 101 based on rotor 101a position versus time data. Any other suitable blocks and or reorganization of blocks of the method 200 are also contemplated herein.

By using the systems and methods disclosed herein, increased system efficiency is realized because the number of clock resources used by the second control system (e.g., an FPGA) is reduced, computational resources (e.g., multipliers/dividers) can be shared between control systems, and the gate count (of an FPGA) can be reduced.

The methods and systems of the present disclosure, as described above and shown in the drawings, provide for synchronization of control systems that are asynchronous due to differing clock domains/speeds. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system, comprising:
a first control system configured to operate at a first clock speed;
a second control system configured to provide an output to the first control system and configured to operate at a second clock speed different from the first clock speed;
a synchronization module operatively connecting the first control module to the second control module and configured to synchronize the first control system and the second control system such that the output of the second control system is timed to synchronize with the first clock speed; and
an electric motor operatively connected to the second control system;
wherein the system is configured to:
start a loop sample timer to sample the clock speed of the first control system or to track the clock speed of the first control system;
receive speed data regarding the speed of the electric motor;
calculate error of the speed of the electric motor as compared to a speed command;
generate a new duty cycle command for input into the first control system; and
input the new duty cycle command into the first control system upon completion of the loop sample timer.

2. The system of claim 1, wherein the first control system includes a motor compensation controller for controlling speed of the electric motor.

3. The system of claim 2, wherein the second control system includes a field-programmable gate array (FPGA).

4. The system of claim 3, wherein the first clock speed is less than about 1 MHz.

5. The system of claim 4, wherein the second clock speed is greater than about 1 MHz.

6. The system of claim 5, wherein the first clock speed is about 100 Hz.

7. The system of claim 1, wherein the synchronization module is implemented on one of the first control system, the second control system, or a state machine.

8. A method for synchronizing asynchronous control systems, comprising:
initializing an electric motor compensation to control speed of an electric motor; starting a loop sample timer to sample the clock speed of a motor control system or to track the clock speed of the motor control system;
receiving speed data regarding the speed of the electric motor;
calculating error of the speed of the motor as compared to a speed command;

generating a new duty cycle command for input; and inputting the new duty cycle command upon completion of the loop sample timer.

9. The method of claim 8, wherein receiving speed data includes determining the speed of the electric motor based on rotor position versus time data.

* * * * *